United States Patent [19]
Merritt, Jr. et al.

[11] 3,821,325
[45] June 28, 1974

[54] ORGANOPOLYSILOXANE-POLYCARBONATE BLOCK COPOLYMERS

[75] Inventors: Will D. Merritt, Jr., Lenox, Mass.; Jorgen H. Vestergaard, Mt. Vernon, Ind.

[73] Assignee: General Electric Company, Schenectady, N.Y.

[22] Filed: Mar. 23, 1973

[21] Appl. No.: 344,188

[52] U.S. Cl. .... 260/824 R, 260/46.5 R, 260/47 XA
[51] Int. Cl............................................. C08g 47/10
[58] Field of Search .................... 260/46.5 R, 824 R

[56] References Cited
UNITED STATES PATENTS
3,189,662   6/1965   Vaughn, Jr...................... 260/824 R
3,679,774   7/1972   Le Grand........................ 260/824 R Primary Examiner—Melvyn I. Marquis

[57] ABSTRACT

An improved process for the preparation of organopolysiloxane-polycarbonate block copolymers from halogen chain-stopped organopolysiloxane, dihydric phenol and phosgene is provided by reacting the halogen chain-stopped organopolysiloxane with dihydric phenol and using alkali metal hydroxide as the acid acceptor in the subsequent phosgenation which forms the final copolymer.

7 Claims, No Drawings

ORGANOPOLYSILOXANE-POLYCARBONATE BLOCK COPOLYMERS

This invention relates to the preparation of organopolysiloxane-polycarbonate block copolymers. More particularly, it relates to an improved process for the preparation of such copolymers in which the reaction product of a halogen chain-stopped organopolysiloxane and a dihydric phenol is phosgenated in the presence of additional dihydric phenol using an alkali metal hydroxide as the acid acceptor and maintaining the phosgenation reaction mixture at a pH of from about 6 to 12 and preferably 8 to 11.

The reaction of halogen chain-stopped organopolysiloxane with dihydric phenol and phosgene to form organopolysiloxane-polycarbonate block copolymers is well known and is described, for example, in U.S. Pat. No. 3,189,662 assigned to the same assignee as the present invention. According to the above patent, pyridine is used as an acid acceptor in the initial halogen chain-stopped organopolysiloxane-dihydric phenol reaction and in the phosgenation. While this process has been found to be efficacious, pyridine is quite expensive and is difficult to either recover or dispose of after it has played its role in the reaction. Additionally, traces of pyridine which remain in the final copolymer reaction product lead to thermal degradation of the final product. It is accordingly a primary object of the present invention to provide an improved process for the preparation of organopolysiloxane-polycarbonate block copolymers.

Briefly, according to the invention, organopolysiloxane-polycarbonate block copolymers are prepared by phosgenating the reaction product of an organopolysiloxane and a dihydric phenol in the presence of additional dihydric phenol using alkali metal hydroxide as the acid acceptor and maintaining the phosgenation reaction mixture at a pH of from about 6 to 12 and preferably 8 to 11. The reaction of the halogen chain-stopped organopolysiloxane with dihydric phenol can be carried out using as an acid acceptor any suitable material such as the pyridine of the above cited patent or ammonia, primary amine or secondary amine, etc. It has been found that using alkali metal hydroxide as an acid acceptor in the phosgenation reaction results in an end product with improved stability.

The compositions of the present invention, referred to hereinafter as the "copolymers" have the average formula (1)

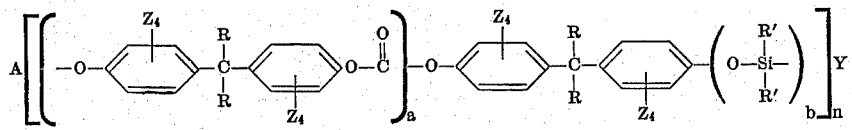

where $n$ is at least 1, and preferably $n$ is an integer equal to from 1 to about 1,000, inclusive, $a$ is equal to from 1 to about 200, inclusive, $b$ is equal to from about 5 to about 200, inclusive, and preferably $b$ has an average value from about 15 to about 90, inclusive, while the ratio of $a$ to $b$ can vary from about 0.05 to about 3, inclusive, and when $b$ has an average value of from about 15 to about 90, inclusive, the ratio of $a$ to $b$ is preferably from about 0.067 to about 0.45, inclusive, Y is

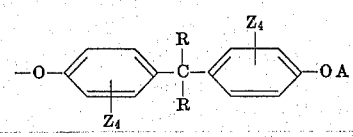

A is a member selected from the class of hydrogen and

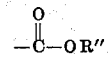

R is a member selected from the class of hydrogen, monovalent hydrocarbon radicals and halogenated monovalent hydrocarbon radicals, R' is a member selected from the class of monovalent hydrocarbon radicals, halogenated monovalent hydrocarbon radicals and cyanoalkyl radicals, R'' is a member selected from the class of monovalent hydrocarbon radicals and halogenated monovalent hydrocarbon radicals, and Z is a member selected from the class of hydrogen, lower alkyl radicals and halogen radicals, or any combination thereof.

Included within the radicals represented by R of Formula 1 are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl, including methyl, ethyl, propyl, chlorobutyl, cyclohexyl, etc.; R can be all the same radical or any two or more of the aforementioned radicals, while R is preferably methyl, R' includes all radials included by R above except hydrogen, where R' also can be all the same radical or any two or more of the aforementioned R radicals except hydrogen, and R' is preferably methyl, R' also includes, in addition to all the radicals included by R, except hydrogen, cyanoalkyl radicals such as cyanoethyl, cyanobutyl, etc. radicals. Included within the definition of Z of Formula 1 are hydrogen, methyl, ethyl, propyl, chloro, bromo, iodo, etc., and Z is preferably hydrogen.

The hydrolytically stable copolymers of the present invention can be further described as comprising recurring copolymeric units of a polydiorganosiloxane joined by substituted aryloxy-silicon linkages to a polyester of dihydric phenol and carbonic acid, where each of said recurring copolymeric units comprises by average weight from about 10 percent to about 75 percent of said polydiorganosiloxane, and preferably from about 40 to 70 percent by weight.

The copolymers of Formula 1 can be produced by first reacting at temperatures in the range of 0° to 100° C, preferably 20° to 50° C, and in the presence of an acid acceptor, a mixture of a halogen chain-stopped polydiorganosiloxane having the formula (2)

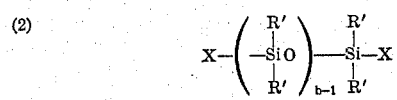

and a dihydric phenol having the formula (3)

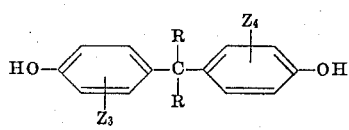

and thereafter phosgenating the reaction product in the presence of additional dihydric phenol until the resulting mass achieves a maximum viscosity, where R, R', Z, b are as defined above, and X is a halogen radical, preferably chloro.

The halogen chain-stopped polydiorganosiloxanes of Formula 2 hereinafter referred to as the "halogenated polysiloxane" can be made by conventional procedures such as by the controlled hydrolysis of a diorganodihalosilane, for example, dimethyldichlorosilane as taught in Patnode U.S. Pat. No. 2,381,366 and Hyde U.S. Pat. Nos. 2,629,726 and 2,902,507.

Another procedure that can be employed involves equilibrating a mixture of a diorganodichlorosilane and a cyclic polydiorganosiloxane in the presence of a metal catalyst such as ferric chloride as shown in Saver U.S. Pat. No. 2,421,653. Although the various procedures utilized in forming the halogenated polysiloxane are not critical, generally it has been found desirable to maintain the halogen content of the resulting halogenated polysiloxane in the range of about 0.4 to about 35 percent, by weight, and preferably from about 1 to about 10 percent by weight of said halogenated polysiloxane. The halogenated polysiloxane is preferably a chlorinated polydimethylsiloxane.

Dihydric phenols included in Formula 3 are, for example, 2,2-bis(4-hydroxyphenyl)-propane (bisphenol-A); 2,4'-dihydroxydiphenylmethane; bis-(2-hydroxyphenyl)-methane; bis-(4-hydroxyphenyl)-methane; 1,1-bis-(4-hydroxyphenyl)-ethane; 1,2-bis-(4-hydroxyphenyl)-ethane; 1,1-bis-(4-hydroxy-2-chlorophenyl)-ethane; 1,1-bis-(2,5-dimethyl-4-hydroxyphenyl)-ethane; 1,3-bis-(3-methyl-4-hydroxyphenyl)-propane; 2,2-bis-(3-isopropyl-4-hydroxyphenyl)-propane, etc.

In the practice of the present invention, the reaction of the halogenated polysiloxane of Formula (2) and the dihydric phenol of Formula (3) in the presence of an acid acceptor produces an intermediate reaction product in the form of a polydiorganosiloxane that is chain-stopped by a hydroxyaryloxy radical. This reaction product is then in the presence of additional dihydric phenol phosgenated, i.e., treated with a precursor of carbonic acid such as carbonyl chloride or carbonyl fluoride in the presence of alkali metal hydroxide such as sodium hydroxide, potassium hydroxide and the like to maintain a pH of from about 6 to 12, preferably about 8 to 11, until the resulting copolymer obtains a maximum viscosity. It has been found that the concentration of the added alkali metal hydroxide is not critical, concentrations of from about 5 to 50 percent by weight having been found useful.

In order that those skilled in the art may be better able to practice the invention, the following examples are given by way of illustration and not by way of limitation. All parts are by weight unless otherwise indicated.

Halogenated polysiloxanes were prepared in accordance with the following procedures.

Example 1

Into a vessel containing 800 parts of dimethyldichlorosilane, there was added over a 2-hour period a mixture of 100 parts of water and 206 parts of dioxane. The resulting mixture was heated to a gentle reflux with stirring until it had become homogeneous. The mixture was stripped, in vacuo, to a pot temperature of 202° C at 12 mm. pressure. The stripped hydrolyzate was then filtered to yield 323 parts of a clear oil containing 4.9 percent hydrolyzable chlorine. The calculated average formula of the halogenated polydimethylsiloxane was as follows based on method of preparation and hydrolyzable chlorine content.

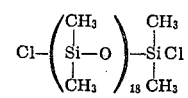

Example 2

To a vessel containing 283 parts ethyl ether and 400 parts dimethyldichlorosilane were added, over a 2-hour period, 50.2 parts distilled water. The mixture was then gently refluxed for 2 more hours. The mixture was stripped at atmospheric pressure to remove the ether and then at 260° C at 26 mm. Hg pressure. The resulting product contained 9.2 percent hydrolyzable chlorine. The calculated average formula of the halogenated polydimethylsiloxane was as follows based on the method of preparation and hydrolyzable chlorine content:

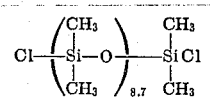

Example 3

This example illustrates the preparation of the halogenated polysiloxane-dihydric phenol reaction product.

To a vessel equipped with gas inlet tube, condenser and stirrer and outlet stopcock, there were charged 456 parts bisphenol-A and 8,000 parts of methylene chloride. With constant stirring, about 40 parts of gaseous ammonia were added through the gas inlet tube extending below the liquid surface until the bisphenol-A dissolved. This procedure took about 15 minutes. There were then added to the mixture over a period of about 45 minutes, 1,535 parts of the chlorinated dimethylpolysiloxane of Example 1, the stirring being continued for about 15 more minutes after which 2,000 parts of water were added. The mixture was then acidified to a pH of about 6 with concentrated HCl, the mixture after standing separating into two layers. The organic layer containing the product was recovered from a bottom outlet in the vessel and further purified. The product was obtained as an 18.4 percent solution in methylene chloride.

Example 4

This example illustrates the phosgenation of the reaction product of Example 3 utilizing alkali metal hydroxide as the acid acceptor.

To a four-necked reaction vessel equipped with agitator, phosgene diptube, reflux condenser, dropping funnel and a pH combination electrode there were added 767 parts of water. There were then added 0.5 part of triethylamine as a catalyst, 423 parts of the 18.4 percent methylene chloride solution of Example 3 and 42 parts of 2,2-bis(4-hydroxyphenyl)-propane along with 620 parts of methylene chloride, it being understood that other solvents such as ethylene chloride and the like can also be used as well. The pH of the formulation mixture was 9.5. Phosgene was then introduced at the rate of 0.9 part per minute and 8 percent sodium hydroxide solution was added from a dropping funnel as required to maintain the pH of the reaction mixture in the range of 9.3 to 9.5. This simultaneous addition of phosgene and sodium hydroxide was continued until a blow-by of phosgene through the condenser indicated completion of the reaction. At this point the intrinsic viscosity of the copolymer in dioxane was 0.54 dl/g. The water and organic phases were separated by decantation, the organic phase being purified by consecutive extractions with sodium hydroxide and hydrochloric acid followed by several extractions with water. The purified copolymer solution was dried and filtered. Films of the copolymer cast from a chloroform solution were found to be strong, clear and elastic.

Example 5

Example 4 was repeated in every respect except that 555 parts of the 18.4 percent methylene chloride solution of Example 3 were used along with 19 parts of 2,2-bis(4-hydroxyphenyl)-propane, 510 parts of methylene chloride, 767 parts of water, and the same amount of triethylamine with the phosgene being added at the rate of 0.4 part per minute until blow-by of phosgene indicated completion of the reaction. The material was purified in the same manner as described in Example 4. The intrinsic viscosity in dioxane of the resulting copolymer was 0.48 dl/g and again films cast from a chloroform solution were clear, strong and elastic.

Example 6

Example 4 was repeated except that 220 parts of the methylene chloride solution of Example 3 were used along with 89 parts of 2,2-bis(4-hydroxyphenyl)-propane and 780 parts of methylene chloride with a phosgene addition rate of 0.4 part per minute until blow-by of phosgene indicated completion of the reaction. The intrinsic viscosity of the purified copolymer so prepared was 0.65 dl/g in dioxane and films cast from a chloroform solution were strong, clear and elastic.

As pointed out above, it will be realized that other methods than those using ammonia as an acid acceptor in the end-capping of the halogenated organopolysiloxane by means of dihydric phenol can be employed.

The copolymers of the present invention are useful as electrical and other insulation, as binding materials for structures and laminates, in adhesive formulations, coating compositions and the like.

What we claim as new and desire to be secured by letters patent of the United States is:

1. A process for making block copolymers which comprises (1) reacting in the presence of acid acceptor (A) a halogen chain-stopped polydiorganosiloxane composed of from about 5 to 200 chemically combined diorganosiloxy units consisting essentially of dialkylsiloxy units which are connected to each other by silicon-oxygen-silicon linkages wherein each of the silicon atoms has two organo radicals attached through a carbon-silicon bond, and (B) a dihydric phenol having the formula

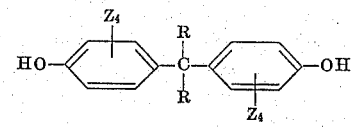

where Z is a member selected from the class consisting of hydrogen, lower alkyl radicals and halogen radicals or any combination thereof, and R is a member selected from the class consisting of hydrogen and lower alkyl radicals, and (2) phosgenating the reaction product of (1) in the presence of additional dihydric phenol at a pH of from about 6 to 12 until the resulting copolymer achieves a maximum intrinsic viscosity, said process being characterized by the addition of alkali metal hydroxide to the phosgenation reaction as an acid acceptor.

2. The process of claim 1 wherein said alkali metal hydroxide is used to maintain the reaction mixture at a pH of from about 8 to 11.

3. The process of claim 1 wherein the phosgenation temperature is from 0° to 100° C.

4. The process of claim 1 wherein the phosgenation temperature is from 20° to 50° C.

5. The process of claim 2 wherein said dihydric phenol is 2,2-bis(4-hydroxyphenyl)-propane.

6. The process of claim 1 wherein said polydiorganosiloxane is a polydimethylsiloxane.

7. The process of claim 1 wherein said alkali metal hydroxide is sodium hydroxide.

* * * * *